Feb. 21, 1933. F. L. MORSE 1,898,492
DEVICE FOR PREVENTING UNDESIRED BACKWARD MOTION OF AUTOMOBILES
Filed April 3, 1931  3 Sheets-Sheet 1
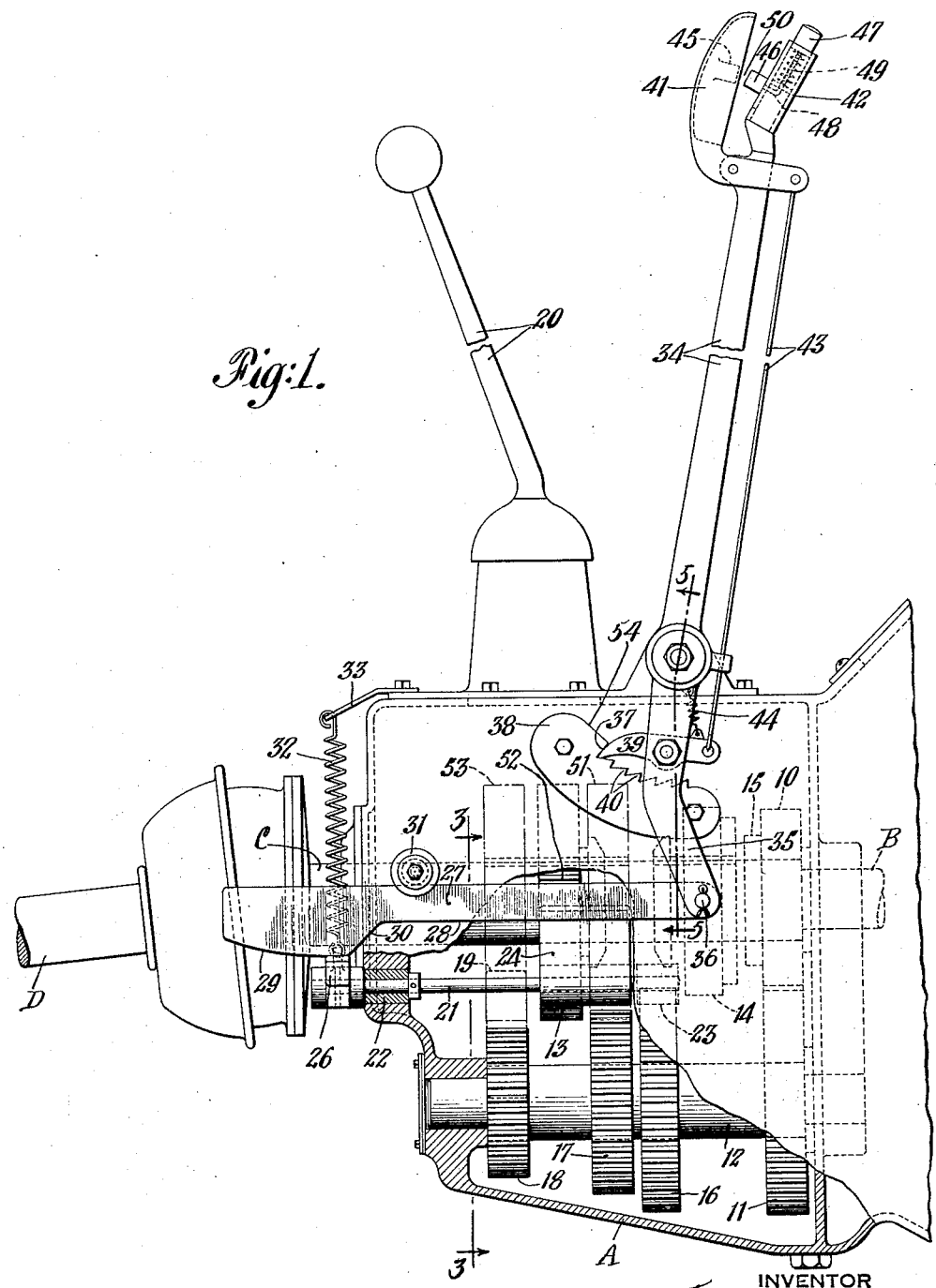
Fig:1.
INVENTOR
Frank L. Morse
BY
Synnestvedt & Lechner
ATTORNEYS Feb. 21, 1933. F. L. MORSE 1,898,492
DEVICE FOR PREVENTING UNDESIRED BACKWARD MOTION OF AUTOMOBILES
Filed April 3, 1931 3 Sheets-Sheet 2
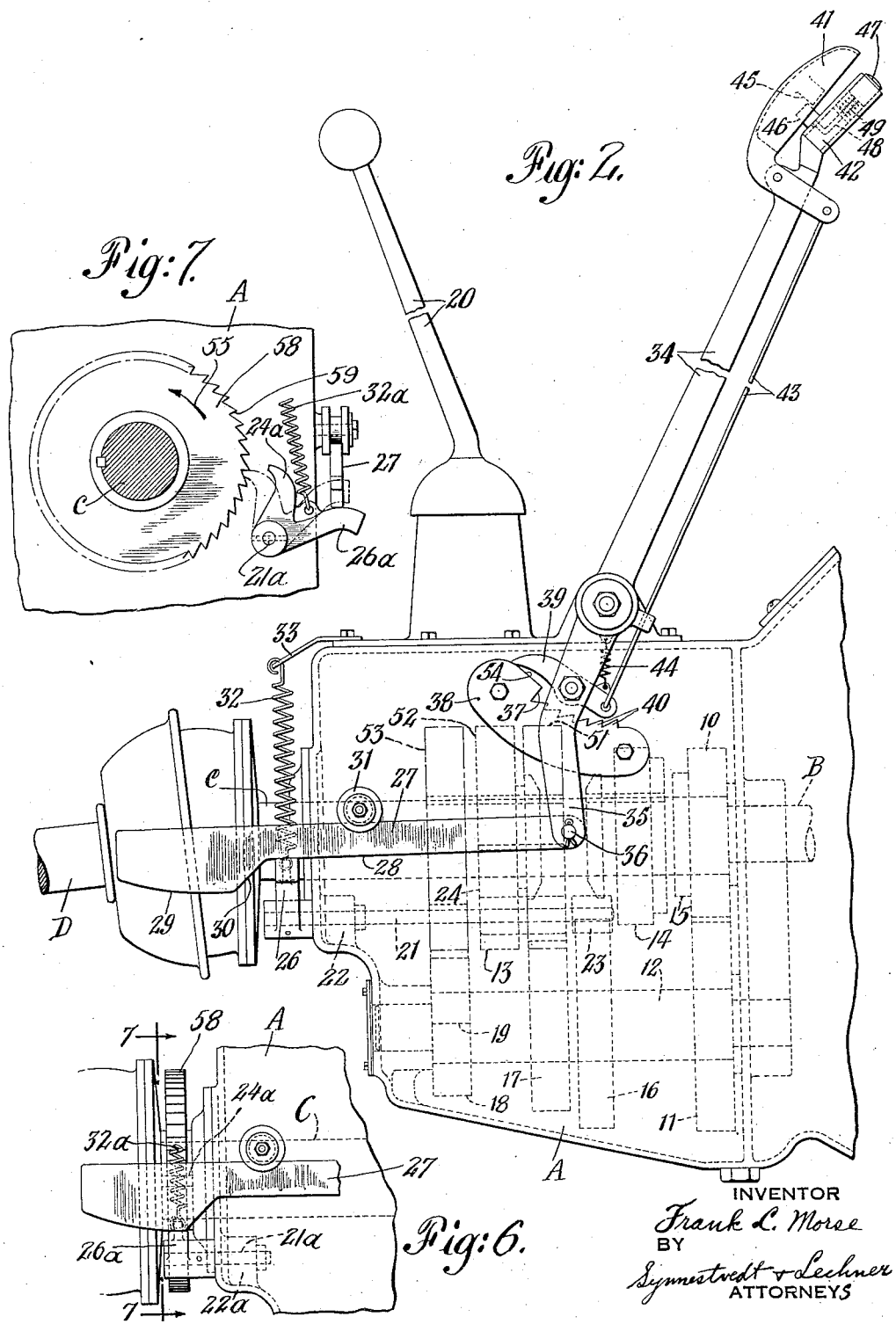

Feb. 21, 1933.  F. L. MORSE  1,898,492
DEVICE FOR PREVENTING UNDESIRED BACKWARD MOTION OF AUTOMOBILES
Filed April 3, 1931    3 Sheets-Sheet 3
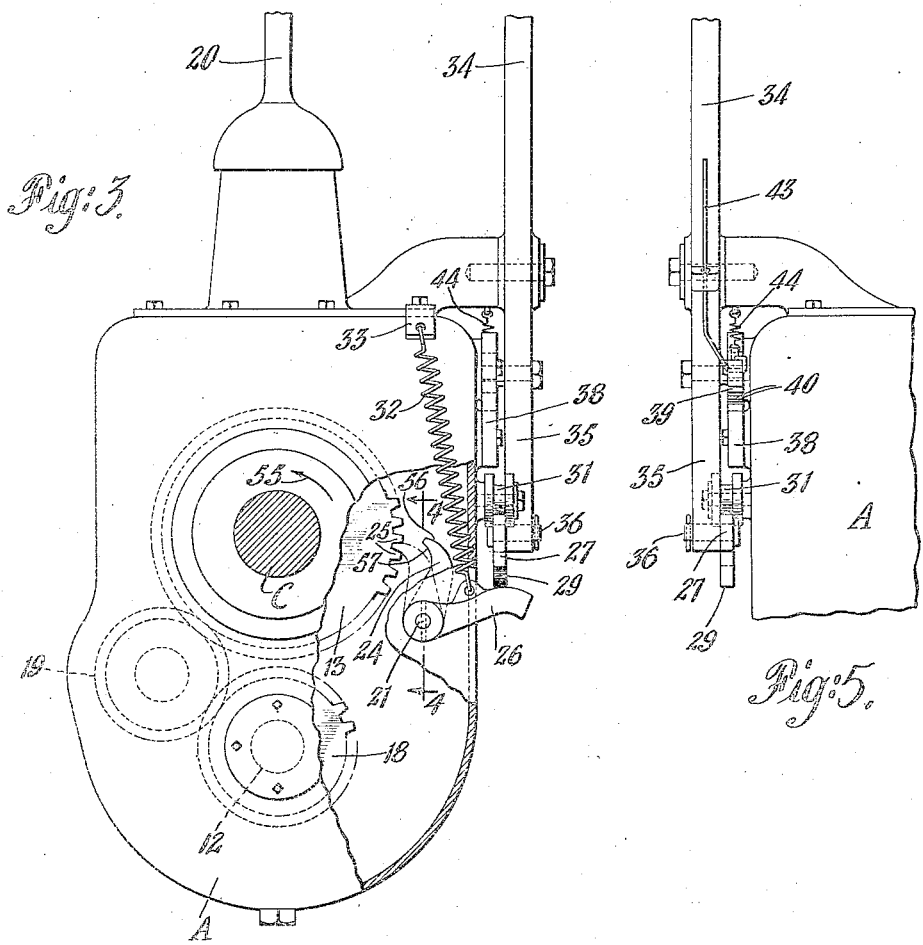
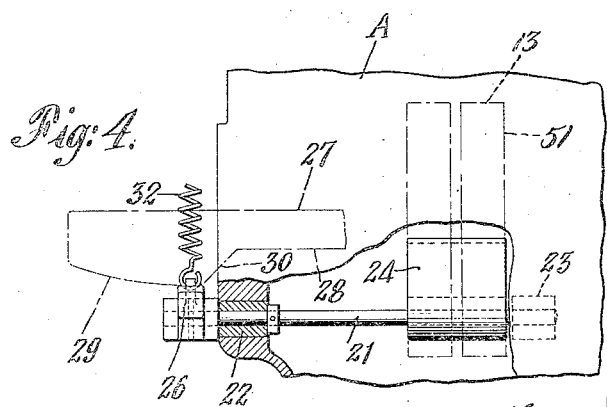
INVENTOR
Frank L. Morse
BY
Synnestvedt & Lechner
ATTORNEYS Patented Feb. 21, 1933

1,898,492

UNITED STATES PATENT OFFICE

FRANK L. MORSE, OF ITHACA, NEW YORK

DEVICE FOR PREVENTING UNDESIRED BACKWARD MOTION OF AUTOMOBILES

Application filed April 3, 1931. Serial No. 527,446.

This invention relates to devices for preventing unintended or undesired backward movement of automobiles, i. e., backward movement such as often occurs in shifting gears while going up grades.

The invention is particularly useful for the less experienced operators of automobiles although it also is of great convenience to all operators for it not only prevents the automobile from rolling backward in shifting gears on an up grade, but also may be employed to hold the automobile against backward movement for other purposes.

The primary object of my invention is the provision of a device of the above character which is very simple in construction, inexpensive to manufacture, and very effective in operation.

Another object of my invention is the provision of a device of the character described which is manually controllable.

A further object resides in the provision of a manually controllable device for preventing undesired backward movement of an automobile in which the control may be effected from an existing control mechanism of the automobile.

A more specific object resides in the provision of a device of the character described which is adapted to be associated with a gear of the usual transmission device of an automobile.

How the foregoing, together with such other objects and advantages as may hereinafter appear or are incident to my invention, are realized, is illustrated in preferred form in the accompanying drawings wherein:

Fig. 1 is an elevational view partly in section of a portion of a transmission mechanism of an automobile showing an application of my invention thereto.

Fig. 2 is an elevational view similar to Fig. 1 but showing the device in another position.

Fig. 3 is in part an end view of Fig. 1 looking toward the right, and in part a cross-section taken substantially on the line 3—3 of Fig. 1.

Fig. 4 is a fragmentary section taken longitudinally of the transmission device and substantially on the line 4—4 of Fig. 3.

Fig. 5 is a section taken on the line 5—5 of Fig. 1.

Fig. 6 is a fragmentary elevational view of a modified application of my invention.

Fig. 7 is a fragmentary sectional view taken substantially on the line 7—7 of Fig. 6.

Referring now to the drawings, the reference letter A denotes the gear box of an automobile transmission device within which is housed the usual gear transmission gearing. The drive shaft B of the transmission device is connected to the engine shaft by means of the usual clutch mechanism (not shown); and the driven shaft C is connected to the propeller shaft D which in turn is connected to the usual differential associated with the driving wheels of the automobile.

The drive shaft B carries a driving gear 10 meshing with the gear 11 of the lay shaft 12 of the transmission device. The driven shaft C has splined thereon a low and reverse speed shiftable gear 13 and a second and high speed shiftable gear 14. The gear 14 is provided with internal teeth adapted to mesh with the external teeth 15 carried by the drive gear 10 when the gear 14 is shifted to its high or direct speed position. When the gear 14 is shifted to its second speed position, i. e., to the left as viewed in Fig. 1, it meshes with a gear 16 carried by the lay shaft 12. The lay shaft 12 also carries a gear 17 with which the gear 13 is adapted to mesh when it is shifted to its low speed position, i. e., to the right as viewed in Fig. 1. In addition, the lay shaft carries a gear 18 meshing with a reverse idler gear 19 mounted on a stub shaft located to one side of the lay shaft. The gear 13 when shifted to the left as viewed in Fig. 1 meshes with the reverse idler 19 to effect reverse drive. The gears 13 and 14 may be shifted to their various positions by means of the usual gear shift lever 20. The mechanism thus far described is of the well-known standard form used in automobile transmissions.

My invention is primarily concerned with preventing undesired or unintended backward movement of automobiles, particularly when the automobile is being driven upgrade. It often happens when it is attempted to shift gears while traveling up a steep grade, that before the shift is completed the automobile starts to roll backward. I propose to prevent this through the use of a simple manually controlled mechanism which I prefer to associate with the transmission device of the automobile. However, it is to be understood that the device may be located at other points in the automobile as will appear hereafter.

Referring now more particularly to Figs. 1 to 5, it will be seen that I have provided a rock shaft 21 in the transmission case mounted in suitable bearings 22 and 23, and extending parallel to the shafts B, C, and 12 of the transmission device. A pawl 24 is rigidly secured to the rock shaft at a point adjacent the low and reverse shiftable gear 13 and is adapted to engage the teeth 25 of the gear 13 in a manner hereinafter appearing.

The rock shaft extends somewhat through the end of the transmission case and has rigidly secured thereon at such end an arm 26. Thus any movement which is imparted to the arm 26 is transmitted to the pawl 24. The pawl 24 is adapted to be manually controlled through the medium of a cam bar 27 in this instance located outside of the transmission case and extending longitudinally thereof. The cam bar is provided with a depressed cam surface 28, and a raised cam surface 29, there being a sloping cam surface 30 connecting the surfaces 28 and 29. The bar is guided by suitable guide means such as a roller or rollers 31 mounted on the casing A, and is so located that the cam surfaces thereof engage the free end portion of the arm 26. The arm 26 is kept in engagement with the cam surfaces by means of a spring 32 which is connected at its lower end to the arm and at its upper end to a clip 33 secured to the casing A.

The cam bar 27 is adapted to be manually actuated by a suitable control lever and in the preferred form illustrated I employ the emergency brake lever 34 of the automobile for this purpose. To this end the brake lever 34 is provided with an arm 35 which is connected to the cam bar 27 by means of a pin 36. It will thus be seen that when the brake lever 34 is moved to the brake-applying position, i. e., to the left as viewed in Fig. 1, the cam bar 27 will be moved to the right and when the brake lever is moved to the right the cam bar will be moved to the left.

In Fig. 1, I have shown the brake lever 34 in its normal position, i. e., the position it occupies when the brakes are released and also in which my device for preventing unintended rearward movement of the automobile is in its inactive position.

The cam surfaces of the cam bar 27 are so proportioned that with the brake lever in the position just mentioned the raised cam surface 29 will act on the arm 26 to move the arm downwardly with the result that the pawl 24 is moved out of engagement with the teeth 25 of the gear 13. The cam surface 29 is of such length that the arm 26 and pawl 24 will be thus held in any position of the brake lever from its neutral position to its full brake-applying position. Therefore, the device of my invention will not be active in any of these positions.

The brake lever is normally limited in its movement in the direction of brake release by means of an abutment 37 on the ratchet quadrant 38, the abutment being located at a point permitting complete release of the brakes by the brake lever. The abutment 37 is engaged by the end of the pawl 39 which is of the usual form employed in association with the brake lever of automobiles to hold the brake in applied position by engagement with ratchet teeth 40 on the quadrant 38. The pawl 39 is controlled by a latch 41 located at the handle 42 of the brake lever 34, the latch being connected to the pawl by a rod 43 and a spring 44 being provided to hold the pawl in engagement with the quadrant 38.

The latch 41 is provided with a lug 45 adapted to engage a movable stop 46 carried by the handle 42. The movable stop 46 is controlled by a button 47 located in the handle and to which it is connected by means of a rod 48. The button 47 is normally held in its released or non-depressed position by means of a spring 49 which engages the handle at its lower end and the bottom face of the button at its upper end, and when in such released position the stop 46 is in the path of the lug 45 of the latch thus limiting the amount that the latch can be depressed. The clearance at 50 between the lug and stop, however, is sufficient to permit of imparting enough lifting movement to the pawl 39 to allow it to clear the ratchet teeth 40. This amount of lift, however, is not sufficient to have the pawl clear the abutment 37 on the quadrant 38. As thus far described, the brake lever and latch operate in the usual well known manner.

Reverting now, to the gear locking pawl 24 above referred to, it is to be noted that this pawl is of a width such that it will engage the gear 13 when the gear is either in position for low speed drive as indicated in dot-and-dash lines at 51 in Fig. 1, or when in its neutral position as indicated in full lines at 52. However, when the gear 13 is moved to its position for effecting reverse drive of the automobile, as indicated in dot-and-dash lines at 53, it will not be engaged by the pawl 24. My device, therefore, is adapted to prevent undesired rearward movement of the automobile under certain conditions but does not prevent intended rearward drive even though it may be in its active position.

Assuming, now, that it is desired to engage the pawl 24 with the low and reverse shiftable gear 13, the brake lever 34 is moved to a further right hand position as illustrated in Fig. 2 by depressing the button 47 to move the stop 46 out of the path of the lug 45 carried by the latch 41. This permits the latch 41 to be pressed closer to the handle of the brake lever, thus giving an additional lift to the pawl 39 and raising it clear of the abutment 37. The pawl 39 will then ride on the surface 54 of the quadrant 38.

In imparting this additional movement to the brake lever, the arm 35 thereof moves the cam bar 27 to the left so that the arm 26 on the rock shaft 21 leaves the cam surface 29 and rides along the sloping cam surface 30 to the depressed cam surface 28 under influence of the spring 32. This movement is transmitted to the pawl 24 through the medium of the rock shaft 21 and the pawl engages the teeth 25 of the gear 13 thus holding the gear against rotation in a reverse direction.

It is to be noted that the rock shaft 21 is so located with relation to the periphery of the gear 13 that any movement tending to move the gear 13 in its reverse direction will cause the pawl to be rocked in a direction to effect a tighter hold on the gear 13. This is clearly illustrated in Fig. 3 of the drawings in which the arrow 55 indicates the direction of rotation of the gear 13 when the automobile is moving in a forward direction. The surface 56 of the pawl 24 may be disposed at an angle such as will aid in effecting a tighter hold on the gear when it tends to move in reverse direction.

Assuming, now, that the transmission mechanism has been shifted to low speed forward and that the car is moving up a steep grade, and it is desired to shift from low speed into second speed and that this shift was unsuccessful so that the gears of the transmission move to their neutral positions, then the car would start to roll rearwardly unless the brakes were immediately applied. Under such condition the operator moves the emergency brake lever 34 to the position shown in Fig. 2 for effecting the engagement of the pawl 24 with the gear 13. This will lock the gear 13 against rotation in reverse direction so that the automobile will be held against rolling rearwardly, thus making it unnecessary to apply the brakes. It is preferable, however, to set the device in its operating position as soon as it is found that shifts will have to be made on an up grade so that everything will be in readiness for holding the car against such undesired backward movement.

It is to be observed that if the device is left in its operating position after a successful shift has been made, and the car starts moving forward, the teeth 25 of the gear 13 will ratchet past the pawl 24 by reason of the resiliency provided by means of the spring 32. In other words, if the pawl 24 is in engagement with the gear 13 when the gear starts to rotate in the direction of the arrow 55 in Fig. 3, the teeth 25 will ride on the surface 57 of the pawl and the pawl will be lifted out of the teeth against the action of the spring 32. The ratcheting of the teeth of the gear 13 past the pawl will give an indication to the operator that the device may now be placed in its neutral or inactive position.

The device operates in the manner above described no matter which forward speed of the transmission device has been selected for drive for the reason that all drive from the engine to the propeller shaft goes through the driven shaft C on which the gear 13 is splined, and when other forward speeds than low speed forward are in effect the low speed gear 13 is in its neutral position but nevertheless is rotating. As has been pointed out above, however, the device will not be effective when the automobile is being intentionally driven in reverse because then the gear 13 is in a position in which it is out of the path of the pawl 24.

Among other things, the device may be used to hold the automobile against rearward movement when parking on an up grade.

Although I have described my invention in association with the low and reverse shiftable gear 13, it is to be understood that it may be associated with other gears of the transmission. In some instance it may be desirable to mount a gear or ratchet wheel 58 independent of the transmission gears, on the driven shaft C of the transmission or on the propeller shaft at some convenient location. In such cases, however, it will be necessary to move the pawl device to its inactive position when intentionally driving the automobile in reverse gear.

In Figs. 6 and 7, I have illustrated an arrangement in which the ratchet wheel 58 is mounted on the driven shaft C of the transmission and outside of the gear case. In this instance the pawl 24a and the arm 26a are of one piece and are secured to a short rock shaft, 21a having a bearing 22a in the transmission case A. The pawl is operated by a cam bar 27 which is of the same construction and operated in the same manner as the cam bar 27 of Figs. 1 and 2. The ratchet teeth 59 of the ratchet wheel 58 face in a direction so that the pawl 24a when moved to its engaging position prevents backward rotation of the driven shaft C to which it is keyed. A spring 32a corresponding to the spring 32 of Figs. 1 and 2 is provided.

It is also to be understood that a control lever independent from the emergency brake lever may be employed to actuate the device.

I claim:

1. In an automobile, the combination of a transmission device having a driven shaft and a gear splined on said shaft, said gear being axially movable along the shaft to forward, neutral, and reverse positions; a pawl mounted for engagement with the teeth of said gear when the gear is in forward or neutral position; means normally holding the pawl out of engagement with said gear; and manually operable means for moving the pawl into engagement with the gear.

2. In an automobile, the combination of a transmission device having a driven shaft and a gear splined on said shaft, said gear being axially movable along the shaft to forward, neutral, and reverse positions; a pawl mounted for engagement with the teeth of said gear when the gear is in forward or neutral position; manually operable means for moving the pawl into and out of engagement with the gear; and yieldable means associated with the pawl.

3. In an automobile, the combination of a propeller shaft, a toothed wheel having connection with said shaft to rotate therewith, a pawl mounted for engagement with the teeth of said wheel, means normally holding the pawl out of engagement with said wheel, means for moving the pawl into engagement with the teeth of said wheel, and means for yieldingly holding the pawl in operative association with the last two means.

4. In an automobile, the combination of a propeller shaft; a toothed wheel having connection with said shaft to rotate therewith; a pawl mounted for engagement with the teeth of said wheel; means normally tending to move said pawl into engagement with said teeth; an arm carried by said pawl; cam means having a cam surface engaging said arm to hold the pawl out of engagement with said wheel; and a cam surface engaged by the arm permitting the pawl to move into engagement with the teeth of said wheel; and an actuating lever for said cam means.

5. In an automobile, the combination with the usual low and reverse shiftable gear of the automobile transmission mechanism and the emergency brake lever of the automobile, of a pawl mounted for engagement with the teeth of said shiftable gear when the gear is either in its low or neutral position, and means having connection with said emergency brake lever for moving said pawl into engagement or disengagement with said teeth under control of said emergency brake lever.

6. In an automobile, the combination with the usual low and reverse shiftable gear of the automobile transmission mechanism and the emergency brake lever of the automobile, of a pawl mounted for engagement with the teeth of said shiftable gear when the gear is either in its low speed forward or neutral position, an actuating arm for the pawl, a movable cam bar having a cam surface engageable with said arm, means connecting said bar to the emergency brake lever for movement thereby, said cam surface being contoured to cause actuation of the pawl to engaging and non-engaging relation with the shiftable gear as the cam bar is moved.

7. In an automobile, the combination with the usual low and reverse shiftable gear of the automobile transmission mechanism and the emergency brake lever of the automobile, of a pawl mounted for engagement with the teeth of said shiftable gear when the gear is either in its low speed forward or neutral position, an actuating arm for the pawl, a movable cam bar having a cam surface engageable with said arm, means for yieldingly holding the actuating arm in engagement with said cam surface, and means connecting said bar to the emergency brake lever for movement thereby.

8. In an automobile, the combination with the usual low and reverse shiftable gear of the automobile transmission mechanism and the emergency brake lever of the automobile, of a pawl mounted for engagement with the teeth of said shiftable gear when the gear is either in its low speed forward or neutral position, an actuating arm for the pawl, a movable cam bar having a low cam surface and a high cam surface, means for yieldingly holding the actuating arm in engagement with the cam surfaces of the cam bar, and means connecting said bar to the emergency brake lever whereby the pawl is engaged with the shiftable gear when the brake lever is in a position to present one cam surface to the actuating arm and disengaged when the brake lever is in a position to present the other cam surface to the actuating arm.

9. In a device for preventing undesired backward movement of an automobile, the combination of a toothed wheel secured on a rotating part of the automobile which rotates whenever the automobile is in motion, a pawl operatively associated with said wheel, means for moving said pawl into and out of engagement with said wheel including an actuating arm on said pawl, a cam bar engageable with said arm, said cam bar having a cam surface for moving said arm in a direction to cause the pawl to engage the toothed wheel, and a cam surface for moving said arm in a direction to cause the pawl to be disengaged from the toothed wheel, and control means for moving the cam bar to present either cam surface to the actuating arm.

10. In a device for preventing undesired backward movement of an automobile, the combination of a toothed wheel in the transmission system of the automobile, a pawl adapted to be engaged and disengaged with the teeth of said wheel, cam means for effecting such engagement and disengagement, and means connecting said cam means to the emergency brake lever of the automobile for control thereby.

11. In a device for preventing undesired backward movement of an automobile, the combination of a toothed wheel in the transmission system of the automobile, a pawl adapted to be engaged and disengaged with the teeth of said wheel, cam means for effecting such engagement and disengagement, means connecting said cam means to the emergency brake lever of the automobile for control thereby, releasable means for normally preventing movement of the brake lever to a position which would actuate the cam means to cause engagement of the pawl with the toothed wheel, and means for actuating said releasable means to permit movement of the lever to a position for actuating the cam means to cause such engagement.

12. In an automobile, the combination of a gear transmission having a shiftable low speed and reverse gear, an emergency brake lever, a pawl adapted to be engaged and disengaged with the shiftable low speed and reverse gear, an actuating arm connected to said pawl, cam means engaging said actuating arm to cause movement of the pawl to engaging and disengaging relation with said gear, means connecting said cam means to the brake lever, a brake lever quadrant, an abutment on said quadrant located to normally limit movement of the brake lever in its direction of brake release, a pawl carried by the brake lever for engagement with the quadrant and said abutment, a latch carried by the brake lever to release said brake lever pawl, a movable stop carried by the brake lever, means on said latch adapted to normally engage said stop to limit the movement of the latch, and the lift of said brake lever pawl, and means for moving said stop out of the path of the latch to permit additional movement of the latch and additional lift of the brake lever pawl.

13. In an automobile, the combination of a gear transmission having a shiftable low speed and reverse gear, an emergency brake lever, a pawl adapted to be engaged and disengaged with the shiftable low speed and reverse gear, an actuating arm connected to said pawl, cam means engaging said actuating arm to cause movement of the pawl to engaging and disengaging relation with said gear, means connecting said cam means to the brake lever, means associated with said brake lever for normally limiting movement of the brake lever in the direction of brake release, and manually operable means associated with said limiting means for permitting additional movement of the brake lever in the direction of brake release.

14. In an automobile, the combination of a transmission device having a driven shaft and a gear splined on said shaft, said gear being axially movable along the shaft to forward, neutral, and reverse position; a pawl adapted to engage the teeth of said gear, said pawl being of a width to engage said teeth when the gear is either in forward or neutral position; and manually operable means for engaging and disengaging the pawl with said gear.

In testimony whereof I have hereunto signed my name.

FRANK L. MORSE.